United States Patent Office 3,150,047
Patented Sept. 22, 1964

3,150,047
4-[2' - (β - DIMETHYLAMINOETHOXYCARBONYL)-PHENYLAMINO] - 7 - CHLORO-QUINOLINE AND ITS ACID ADDITION SALTS
Andre Allais and Pierre Girault, Paris, France, assignors to Roussel-UCLAF, S.A., Paris, France, a corporation of France
No Drawing. Filed Feb. 6, 1963, Ser. No. 256,512
Claims priority, application France, Feb. 16, 1962, 888,318
10 Claims. (Cl. 167—65)

The invention relates to the novel product, 4-[2'(β-dimethylaminoethoxycarbonyl) - phenylamino]-7-chloro-quinoline and its non-toxic, pharmaceutically acceptable acid addition salts and a process for preparing the said novel product. The invention further relates to novel compositions for the treatment of inflammatory and painful manifestations as well as to a novel method of relieving inflammatory and painful conditions.

4 - [2' - (β - dimethylaminoethoxycarbonyl) - phenyl-amino]-7-chloro-quinoline and its non-toxic, pharmaceutically acceptable acid addition salts have interesting pharmacological properties, particularly a remarkable anti-inflammatory and analgesic activity. They can be used for the treatment of all muscular aches, articulate or nervous, or rheumatismal affectations, of dental or bone pains, of zona, of migraines and of febrile or infectious states.

It is an object of the invention to provide the novel product, 4-[2'-(β-dimethylaminoethoxycarbonyl)-phenyl-amino]-7-chloro-quinoline and its non-toxic, pharmaceutically acceptable acid addition salts.

It is another object of the invention to provide a novel process for the preparation of 4-[2'-(β-dimethylamino-ethoxycarbonyl)-phenylamino]-7-chloro-quinoline.

It is an additional object of the invention to provide novel compositions for the treatment of inflammatory and painful manifestations.

It is a further object of the invention to provide a novel method of treating inflamamtory and painful manifestations.

These and other objects and advantages of the invention will become obvious from the following detailed description.

The novel product, 4-[2-(β-dimethylaminoethoxycarbonyl)-phenylamino]-7-chloro-quinoline, has the formula

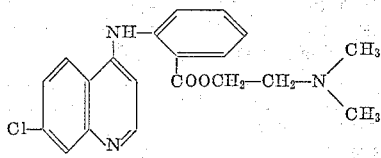

The acid addition salts may be derived from mineral or organic acids.

Examples of suitable acids for the non-toxic pharmaceutically acceptable acid addition salts are mineral acids, such as hydrochloric acid, nitric acid, sulfuric acid, etc. and organic acids, such as citric acid, tartaric acid, acetic acid, etc.

The process of the invention for the preparation of 4 - [2(β - dimethylaminoethoxycarbonyl)-phenylamino]-7-chloro-quinoline comprises reacting 4-[2'-methoxycar-bonyl)-phenylamino]-7-chloro-quinoline with β-dimethyl-aminoethanol in the presence of an alkali metal to form the said product and the free base can then react with a mineral acid or organic acid to form the corresponding acid addition salt of the free base.

The novel compositions of the invention for the treatment of inflammatory and painful manifestations are comprised of a compound selected from the group consisting of 4-[2'-(β-dimethylaminoethoxycarbonyl)-phenyl-amino]-7-chloro-quinoline and its non-toxic, pharmaceutically acceptable acid addition salts and a pharmaceutical carrier. The compositions can be in the form of solutions, or of injectable suspensions, prepared in ampules and multiple dose flacons, in the form of tablets, in the form of suppositories and in the form of pomades made by the usual means.

The novel method of the invention for the treatment of inflammatory and painful manifestations comprises administering an effective amount of a compound selected from the group consisting of 4-[2'-(β-dimethylamino-ethoxycarbonyl)-phenylamino]-7-chloro-quinoline and its non-toxic, pharmaceutically acceptable acid addition salts. The said compounds may be administered orally, trans-cutaneously, rectally or topically on the skin and mucous membranes.

The usual single dose is between 0.050 gm. and 0.200 gm. and the average daily dose is between 0.100 and 1.00 gm. depending upon the method of administration.

4 - [2' - methoxycarbonyl - phenylamino] - 7 - chloro-quinoline used as the starting material for the process of the invention can be obtained according to the process of copending U.S. application No. 207,388, filed July 3, 1962, by reacting 4,7-dichloro-quinoline with methyl an-thranilate under acidic conditions.

In the following example there are described several preferred embodiments to illusrate the invention. However, it should be understood that the invention is not intended to be limited to the specific embodiments.

EXAMPLE

In a 100 cc. balloon flask, 40 cc. of β-dimethylamino-ethanol were introduced under an atmosphere of nitrogen and then 0.05 g. of sodium was introduced. When the sodium had entirely disappeared, 12 g. of 4-[2'-meth-oxycarbonylphenylamino]-7-chloro-quinoline, prepared according to copending application Serial No. 207,388, filed on July 3, 1962, were added. The reaction mixture was heated under at atmosphere of nitrogen to a temperature of 120–125° C. for a period of 5 hours. The reaction mixture was then allowed to cool to room temperature and was poured into 400 cc. of water. The precipitate appearing was maintained at 0° C. for a period of one hour and was then separated, vacuum filtered, washed with water and dried under vacuum. 10 g. of raw product were thus obtained which was purified in 500 cc. of hot ether, treated with decolorizing carbon black, filtered and evaporated to dryness. The dry residue was redissolved in 250 cc. of hexane at reflux temperatures. The hot solution was filtered and allowed to crystallize by cooling. The mixture was iced for a period of one hour and the crystalline precipitate was separated, vacuum filtered, washed with a little hexane and dried under vacuum. 7.5 g. (a yield of 52%) of pure 4-[2'-(β-di-methylaminoethoxycarbonyl) - phenylamino] - 7 - chloro-quinoline having a melting point of 90° C. were obtained.

This product occurred in the form of a colorless solid compound, crystallized in needles. It was soluble in alcohol, ether, acetone, benzene, chloroform and dilute aqueous acids, slightly soluble in olive oil, insoluble in water, dilute alcohols and dilute aqueous alkalis.

This product is new.

*Analysis.*—$C_{20}H_{20}ClO_2N_3$: Molecular weight=369.8. Calculated: C, 64.95%; H, 5.45%; O, 8.65%; N, 11.36%; Cl, 9.58%. Found: C, 64.8%; H, 5.5%; O, 8.7%; N, 11.5%; Cl. 9.7.

The dihydrochloride of 4-[2'-(β-dimethylaminoethoxy-carbonyl)-phenylamino]-7-chloro-quinoline was formed by reacting a solution 4-[2'-(β-dimethylaminoethoxycarbonyl)-phenylamino]-7-chloro-quinoline in ethanol with a stoichiometric amount of hydrochloric acid.

The said dihydrochloride salt occurred in the form of yellow prisms having a melting point of 210 to 212° C. and was soluble in water and alcohol and insoluble in acetone, ether, benzene and chloroform.

This product is new.

Analysis.—$C_{20}H_{22}O_2N_3Cl_3$: Molecular weight=442.8. Calculated: C, 54.25%; H, 5.00%; N, 9.49%; Cl. 24.02%. Found: C, 54.1%; H, 5.0%; N, 9.2%; Cl. 23.6.

The monohydrochloride salt of 4-[2'-(β-dimethylaminoethoxycarbonyl)-phenylamino] - 7 - chloro-quinoline was prepared in an analogous fashion by reaction with an equimolar amount of hydrochloric acid. The said monohydrochloride salt occurred in the form of white prisms having a yellow reflection and having a melting point of 188° C. The compound was practically insoluble in water, soluble in dilute aqueous acids and insoluble in organic solvents.

The dinitrate salt of 4-[2-(β-dimethylaminoethoxycarbonyl)-phenylamino]-7-chloro-quinoline was prepared in an analogous manner by reaction with 1 mole of the free base with two moles of nitric acid. The said dinitrate salt occurred in the form of yellow prisms having a melting point of 170 to 172° C. (with decomposition) and was soluble in water, slightly soluble in alcohol and insoluble in ether, acetone, benzene and chloroform.

PHARMACOLOGICAL DATA

A. Analgesic Activity

The analgesic activity was determined by the test of Kostu et al. (Fed. Proc., vol. 18, 1959, p. 142) wherein the intraperitoneal injection of acetic acid into mice causes repeated movements characteristic of stretching and twisting for more than six hours. Compounds which prevent or suppress this syndrome which can be considered as the exterior manifestations of a diffuse abdominal pain are considered to be analgesics.

For releasing the syndrome, 0.01 cc./g. or 10 mg./kg. of an aqueous solution of 6 parts of acetic acid per 1000 parts of water containing 10% gum arabic were used. To groups of 5 mice kept fasting since the day before test, 4-[2'-(β-dimethylaminoethoxycarbonyl)-phenylamino]-7-chloro-quinoline was administered orally half an hour before the intraperitoneal injection of acetic acid. The stretchings of each mouse were noted and an average of the results were obtained for each group during the periods of 0 to 5 minutes and 15 to 20 minutes after the acetic acid injection. The tests were repeated two more times to obtain the average results summarized in Table I.

TABLE I

|  | Number of stretchings | | | Percentage of stretchings by reference to control, percent |
|---|---|---|---|---|
|  | 0 to 5 min. | 15 to 20 min. | Total number |  |
| Control | 136 | 79 | 215 |  |
| Amount of product used: |  |  |  |  |
| 50 mg./kg. | 71 | 37 | 108 | 50 |
| 100 mg./kg. | 31 | 35 | 66 | 31 |
| 200 mg./kg. | 8 | 18 | 26 | 12 |

The average active dose ($ED_{50}$) for 4-[2'-(β-dimethylaminoethoxycarbonyl) - phenylamino]-7-chloro-quinoline when taken orally was 50 mg./kg. as compared to aspirin whose $ED_{50}$ under the same conditions is 165 mg./kg. Thus, the novel compound of the invention has a greater analgesic activity than aspirin.

B. Anti-Inflammatory Activity (1) *Test of the edematized paw in the rat.*—The test employed consisted in administering to rats weighing from 160 to 170 g., a single injection of 500γ of naphthoylheparamine under the plantar aponeurosis of a hind paw. This injection was destined to provoke the formation of inflammatory edema. The products to be studied were administered orally one hour before the injection. The maximum circumference of the two hind paws were measured 3 hours after the injection, and the difference between the circumference of the two hind paws of each animal (the paw having received the injection of naphthoylheparamine and the untreated paw) served to evaluate the size of the inflammation. By expressing the measure of the inflammation in the treated rats as a percentage with reference to those of the control animals, the following results were observed:

TABLE II

| Test compound: | $ED_{50}$, mg./kg. |
|---|---|
| Aspirin | 100 |
| Phenylbutazone | 30 |
| Amodiaquine | 200 |
| 4-[2'-(β-dimethylaminoethoxycarbonyl)-phenylamino]-7-chloro-quinoline: |  |
| Orally | 30 |
| Subcutaneously | 30 |

The novel product of the invention has greater anti-inflammatory properties than aspirin and amodiaquine and is equal to phenylbutazone.

(2) *Test of erythema caused by ultraviolet rays.*—This test consisted of exposing a lot of guinea pigs to radiation by means of a lamp generating ultraviolet rays for a period of 2 minutes at a distance of 20 cm. The test compounds were administered orally one hour before the radiation. The animals were examined 2 hours after the radiation and the degree of erythema was noted. The degree of erythema of the treated animals was expressed as a percent of that of the control animals which underwent the irradiation after having received only the solvent or the dispersive. The results are summarized in Table III.

TABLE III

| Test compound: | $ED_{50}$, mg./kg. |
|---|---|
| Aspirin | 50–100 |
| Amodiaquine | ≥200 |
| 4 - [2'- (β - dimethylaminoethoxycarbonyl)-phenylamino]-7-chloro-quinoline | 30 |

The results in Table III also show that 4-[2'-(β-dimethylaminoethoxycarbonyl) - phenylamino] - 7 - chloro-quinoline has a greater anti-inflammatory activity than aspirin or amodiaquine.

C. Acute Toxicity

The acute toxicity of 4-[2'-(β-dimethylaminoethoxycarbonyl)-phenylamino]-7-chloro-quinoline was determined on Rockland strain mice weighing between 18 and 22 gm. The said product was administered in aqueous solution by intraperitoneal injection and orally to lots of 10 mice who were held under observation for 8 days. The average toxic doses ($LD_{50}$) were as follows:

| | Mg./kg. |
|---|---|
| Intraperitoneal injection | 300 |
| Orally | 1500 |

Various modifications of the compositions of the invention may be made without departing from the spirit or scope thereof, and it is to be understood that the invention is intended to be limited only as defined in the appended claims.

We claim:

1. A compound selected from the group consisting of 4 - [2' - (β - dimethylaminoethoxycarbonyl) - phenylamino]-7-chloro-quinoline and its non-toxic, pharmaceutically acceptable acid addition salts.

2. The monohydrochloride of 4-[2'-(β-dimethylaminoethoxycarbonyl) - phenylamino] - 7 - chloro - quinoline.

3. The dihydrochloride of 4-[2'-(β-dimethylaminoethoxycarbonyl)-phenylamino]-7-chloro-quinoline.

4. The dinitrate of 4-[2'(β-dimethylaminoethoxycarbonyl)-phenylamino]-7-chloro-quinoline.

5. 4 - [2' - (β - dimethylaminoethoxycarbonyl) - phenylamino]-7-chloro-quinoline.

6. A composition for the treatment of inflammatory and painful manifestations comprising 0.050 to 0.200 gm. of a quinoline selected from the group consisting of 4-[2'-(β - dimethylaminoethoxycarbonyl) - phenylamino] - 7-chloro-quinoline and its non-toxic, pharmaceutically acceptable acid addition salts and a pharmaceutical carrier.

7. The composition of claim 6 wherein the quinoline is 4 - [2' - (β - dimethylaminoethoxycarbonyl) - phenylamino]-7-chloro-quinoline.

8. The composition of claim 6 wherein the quinoline is the dihydrochloride of 4-[2'-(β-dimethylaminoethoxycarbonyl)-phenylamino]-7-chloro-quinoline.

9. The composition of claim 6 wherein the quinoline is the dinitrate of 4-[2'-(β-dimethylaminoethoxycarbonyl)-phenylamine]-7-chloro-quinoiine.

10. The composition of claim 6 wherein the quinoline is the monohydrochloride of 4-[2'-(β-dimethylaminoethoxycarbonyl)-phenylamino]-7-chloro-quinoline.

References Cited in the file of this patent
UNITED STATES PATENTS

| | | |
|---|---|---|
| 1,810,267 | Desamari | June 16, 1931 |
| 2,138,628 | Diedrich | Nov. 29, 1938 |
| 2,568,778 | Surrey et al. | Sept. 25, 1951 |
| 3,004,889 | Kuna et al. | Oct. 17, 1961 |
| 3,024,166 | Kuna et al. | Mar. 6, 1962 |